(12) United States Patent
Miyajima et al.

(10) Patent No.: US 8,878,125 B2
(45) Date of Patent: Nov. 4, 2014

(54) ENCODER WITH GEAR MECHANISM AND OPTICAL ENCODER DEVICE

(75) Inventors: Tooru Miyajima, Nagano (JP); Toshiaki Ayuzawa, Nagano (JP); Yoshihiro Shoji, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 195 days.

(21) Appl. No.: 13/548,397

(22) Filed: Jul. 13, 2012

(65) Prior Publication Data

US 2013/0015333 A1    Jan. 17, 2013

(30) Foreign Application Priority Data

Jul. 15, 2011    (JP) .................... 2011-156366

(51) Int. Cl.
| | |
|---|---|
| G01D 5/249 | (2006.01) |
| G01D 5/12 | (2006.01) |
| G01D 5/34 | (2006.01) |
| G01D 5/347 | (2006.01) |

(52) U.S. Cl.
CPC .................... G01D 5/3473 (2013.01)
USPC ........ 250/231.15; 250/239; 356/617; 341/13; 341/15

(58) Field of Classification Search
USPC ............. 250/231.13, 231.14, 231.15, 231.16, 250/231.18, 239, 237 G, 237 R, 229, 231.1, 250/216; 341/1, 2, 11, 13, 14, 16, 15; 356/706, 707, 614–619; 33/700, 706, 33/707

See application file for complete search history.

(56) References Cited

U.S. PATENT DOCUMENTS

| | | | | |
|---|---|---|---|---|
| 3,693,024 | A * | 9/1972 | Hulle et al. | 250/231.15 |
| 3,973,849 | A * | 8/1976 | Jackson et al. | 356/320 |
| 4,660,288 | A * | 4/1987 | Dangschat | 33/1 L |
| 4,712,088 | A * | 12/1987 | Ernst | 341/2 |
| 5,066,857 | A * | 11/1991 | Ernst | 250/231.15 |
| 5,393,201 | A * | 2/1995 | Okutani et al. | 417/16 |
| 5,640,007 | A * | 6/1997 | Talbott et al. | 250/231.15 |
| 6,124,709 | A * | 9/2000 | Allwine | 324/207.2 |
| 6,470,577 | B1 * | 10/2002 | Tondorf et al. | 33/1 PT |
| 6,483,105 | B2 * | 11/2002 | McAllister et al. | 250/231.13 |
| 6,542,088 | B1 * | 4/2003 | Bielski et al. | 341/15 |
| 6,617,571 | B2 * | 9/2003 | Thaler et al. | 250/231.13 |
| 6,683,545 | B2 * | 1/2004 | Strasser | 341/16 |
| 6,828,783 | B2 * | 12/2004 | Schroter et al. | 324/207.25 |
| 7,017,274 | B2 * | 3/2006 | Stobbe | 33/1 PT |
| 8,063,355 | B2 * | 11/2011 | Lee et al. | 250/231.14 |
| 8,154,427 | B2 * | 4/2012 | Mayer et al. | 341/2 |
| 8,159,096 | B2 * | 4/2012 | Tezuka et al. | 310/68 B |
| 2003/0112157 | A1 * | 6/2003 | Strasser | 341/2 |

(Continued)

FOREIGN PATENT DOCUMENTS

| | | |
|---|---|---|
| JP | 08-050033 | 2/1996 |
| JP | 09-218055 | 8/1997 |

*Primary Examiner* — John Lee
(74) *Attorney, Agent, or Firm* — Rankin, Hill & Clark LLP

(57) ABSTRACT

Provided herein is an encoder including a position detecting device provided with a gear mechanism and an optical encoder device. A housing includes a bearing holder provided between a first housing portion and a second housing portion of the housing. The bearing holder serves as a partition wall portion configured to separate the gear mechanism from the optical encoder device. If the gear mechanism is separated from the optical encoder device, abrasion powder or grease can be reliably prevented from scattering from the gear mechanism to adhere to constituent parts of the optical encoder device.

7 Claims, 4 Drawing Sheets

(56) References Cited

U.S. PATENT DOCUMENTS

| | | | |
|---|---|---|---|
| 2004/0256545 A1* | 12/2004 | Stobbe | 250/231.13 |
| 2005/0115087 A1* | 6/2005 | Noltemeyer | 33/1 PT |
| 2005/0218311 A1* | 10/2005 | Campany et al. | 250/231.13 |
| 2006/0284086 A1* | 12/2006 | Hasegawa | 250/309 |
| 2007/0281824 A1* | 12/2007 | Tezuka et al. | 475/331 |
| 2010/0176695 A1* | 7/2010 | Tezuka et al. | 310/68 B |
| 2011/0196648 A1* | 8/2011 | Mayer et al. | 702/151 |
| 2013/0015333 A1* | 1/2013 | Miyajima et al. | 250/215 |
| 2013/0144553 A1* | 6/2013 | Omata et al. | 702/151 |
| 2013/0192079 A1* | 8/2013 | Steinich et al. | 33/706 |
| 2013/0212893 A1* | 8/2013 | Stafford et al. | 33/534 |

* cited by examiner

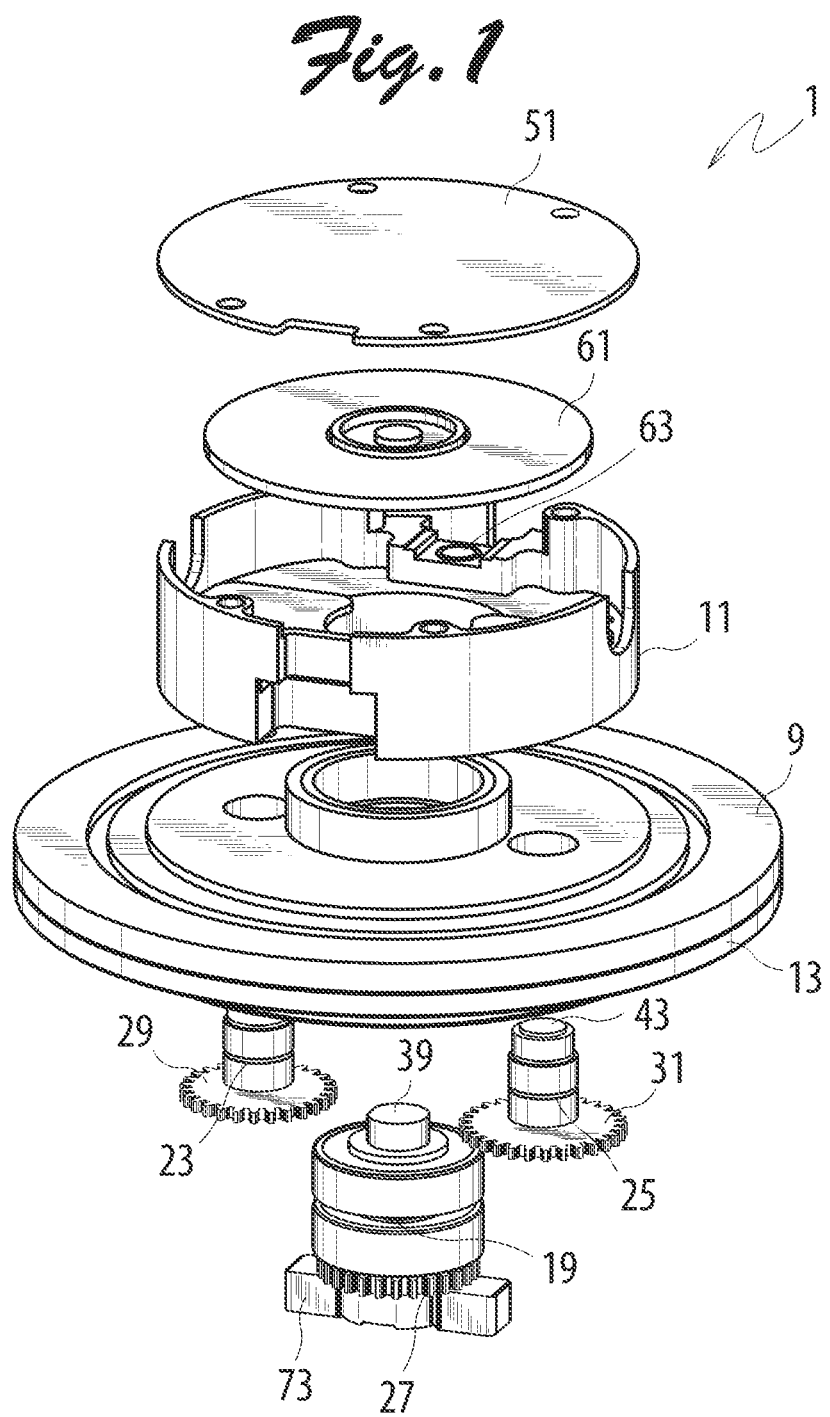

ENCODER WITH GEAR MECHANISM AND OPTICAL ENCODER DEVICE

TECHNICAL FIELD

The present invention relates to an encoder including a position detecting device provided with a gear mechanism and an optical encoder device.

BACKGROUND OF THE INVENTION

Japanese Patent Application Publication No. 09-218055 (JP09-218055A) discloses an absolute encoder including a combination of a resolver and a magnetic encoder device including a gear mechanism. A circuit substrate having a signal processing circuit mounted thereon and the gear mechanism of the magnetic encoder device are disposed in the same housing portion of a housing.

Japanese Patent Application Publication No. 08-050033 (JP08-050033A) discloses an absolute encoder including an optical encoder device formed by utilizing a single rotary disc and a magnetic encoder device.

In such absolute encoders as disclosed in JP09-218055A and JP08-050033A, multiple rotations are detected by a position detecting device formed by the magnetic encoder device.

In order to store data on the multiple rotations without using a battery in an absolute encoder including an optical encoder device and a magnetic encoder device as is disclosed in JP08-050033A, it may be necessary to adopt a gear mechanism in the position detecting device as is disclosed in JP09-218055A. However, if the gear mechanism and other constituent parts are housed in the same housing chamber of a housing as is disclosed in JP09-218055A, the rotary disc or other parts used by the optical encoder device may be contaminated with abrasion powder produced by friction between gears or grease applied to reduce wear of the gears, which may trigger erroneous detection.

SUMMARY OF THE INVENTION

An object of the present invention is to provide an encoder including a position detecting device provided with a gear mechanism and an optical encoder device, in which constituent parts of the optical encoder device can be prevented from suffering contamination due to the presence of the gear mechanism.

The present invention is directed to an encoder including a position detecting device provided with a gear mechanism, an optical encoder device, and a housing that houses the position detecting device and the optical encoder device. In the present invention, the housing is configured to separate the gear mechanism from the optical encoder device. If the gear mechanism is thus separated from the optical encoder device, abrasion powder or grease can be reliably prevented from scattering from the gear mechanism to adhere to constituent parts of the optical encoder device. Therefore, the present invention can provide an encoder including an optical encoder device and a position detecting device including a gear mechanism, in which contamination of constituent parts of the optical encoder device can be prevented, thereby eliminating erroneous detection.

The position detecting device including the gear mechanism may be a magnetic encoder device, a resolver, an optical encoder, or the like.

The position detecting device may include, for example, a main shaft, n sub shafts coupled to the main shaft via the gear mechanism to rotate in synchronization with the main shaft, where n is an integer of 1 or more, and (1+n) position detecting sections operable to detect the respective angular positions of the main shaft and the n sub shafts. The optical encoder device may be configured to detect the angular position of the main shaft by utilizing light.

The encoder may further include a circuit substrate including a detecting circuit operable to detect the absolute position of the main shaft based on a signal output from the position detecting device and a signal output from the optical encoder device. In this case, the housing is preferably configured to separate the gear mechanism from the optical encoder device and the circuit substrate.

Specifically, the housing may include a partition wall portion provided with a plurality of bearings capable of rotatably supporting the main shaft and the n sub shafts, a first housing portion configured to house the (1+n) position detecting sections and the optical encoder device, and a second housing portion configured to house the gear mechanism. The partition wall portion may separate the gear mechanism from the (1+n) position detecting sections, the optical encoder device, and the circuit substrate. By using the partition wall portion, the gear mechanism can be reliably separated or isolated with a simple structure.

In a specific encoder in which a magnetic encoder device is used as the position detecting device, (1+n) gears forming the gear mechanism are fixedly mounted at first ends of the main shaft and the n sub shafts, respectively. Magnetism generating elements are fixedly mounted at second ends of the main shaft and the n sub shafts, respectively. The second ends project from the partition wall portion. The housing houses a first magnetism detecting element operable to detect magnetism of the magnetism generating element provided at the second end of the main shaft, and second to n-th magnetism detecting elements operable to detect magnetism of the magnetism generating elements provided at the second ends of the n sub shafts, respectively. The magnetism generating element and the first magnetism detecting element form one magnetic encoder portion. The magnetism generating elements and the second to n-th magnetism detecting elements form remaining magnetic encoder portions.

The first housing portion of the housing may include a bottom wall portion that contacts the partition wall portion, and a peripheral wall portion integrally provided with the bottom wall portion to extend in a direction away from the partition wall portion. In this configuration, the circuit substrate may be fixed to the peripheral wall portion. This allows the circuit substrate to be utilized as a lid member for the first housing portion, and to be firmly fixed to the first housing portion. Further in this configuration, the first magnetism detecting element may be fixed to the circuit substrate, and a sub circuit substrate may be provided in the first housing portion such that the second to n-th magnetism detecting elements are fixed to the sub circuit substrate. If the second to n-th magnetism detecting elements are disposed on the sub circuit substrate, there may be a space for placement of a rotary disc between the circuit substrate and the sub circuit substrate. Thus, the optical encoder device may include a rotary disc fixed to the main shaft, and a light emitting element and a light receiving element fixed to the circuit substrate. Then, the rotary disc may be disposed between the circuit substrate and the sub circuit substrate. In this configuration, one of the light emitting element and the light receiving element may be fixed to the circuit substrate, and the other may be fixed in the first housing portion. The circuit substrate and the sub circuit substrate may be electrically connected to each other via an electrical connection member to perform position detecting operation without difficulty.

The second housing portion may include a base member and the partition wall portion, the base member including an annular flange portion fixed to the partition wall portion, and a cylindrical portion integrally provided with the annular flange portion to surround the gear mechanism and having an opening portion formed in the center of the cylindrical portion to expose the first end of the main shaft. If the second housing portion is formed by the base member and the partition wall portion, the gear mechanism can be assembled with the base member removed, thereby facilitates assembling.

A coupling may be fixed to the first end of the main shaft in advance, and the coupling may be partly exposed from the opening portion. If such an arrangement is adopted, the base member works as a protection member for the coupling.

BRIEF DESCRIPTION OF THE DRAWINGS

These and other objects and many of the attendant advantages of the present invention will readily be appreciated as the same becomes better understood by reference to the following detailed description when considered in connection with the accompanying drawings.

FIG. 1 is an exploded perspective view of an encoder according to an embodiment of the present invention.

DESCRIPTION OF THE PREFERRED EMBODIMENTS

Figure 2A:
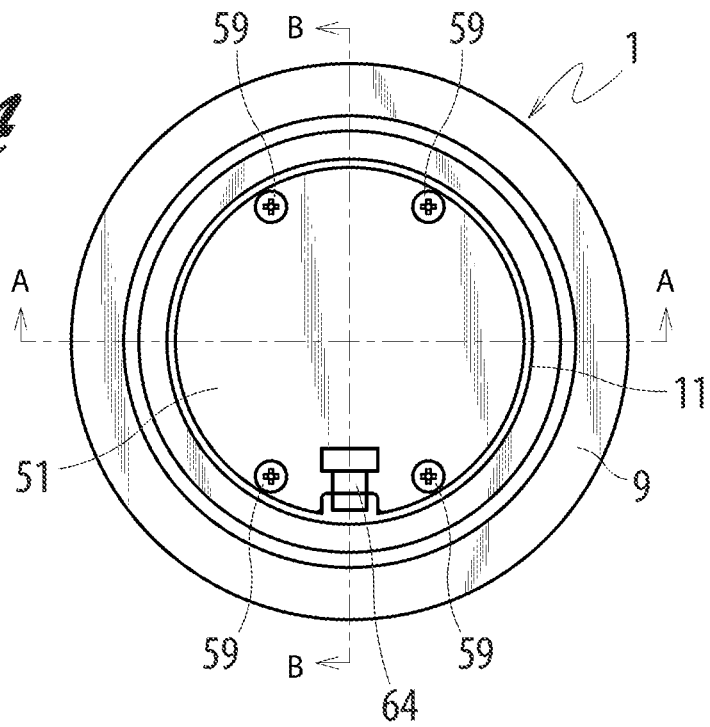
FIGS. 2A and 2B are a plan view and a bottom view, respectively, of the encoder according to the embodiment.
Figure 2B:
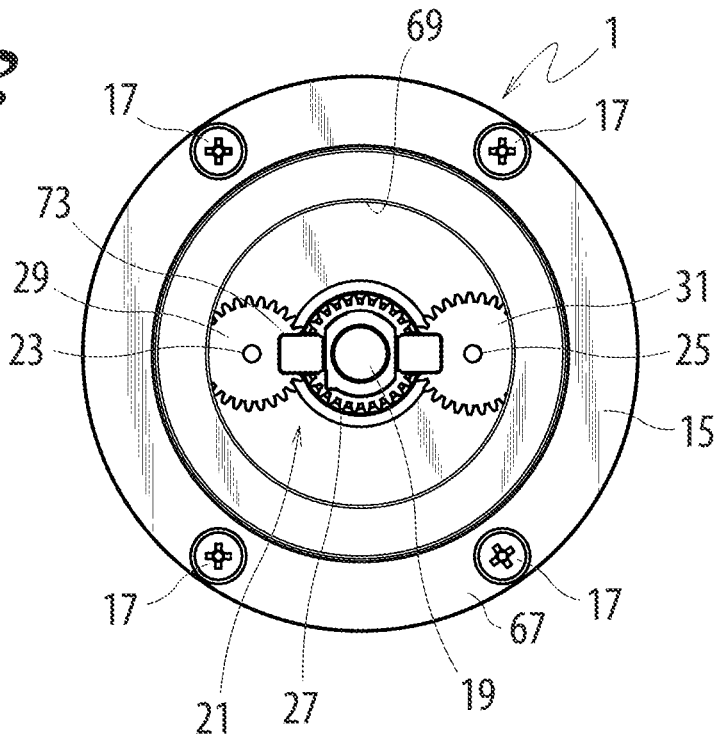
Figure 3:
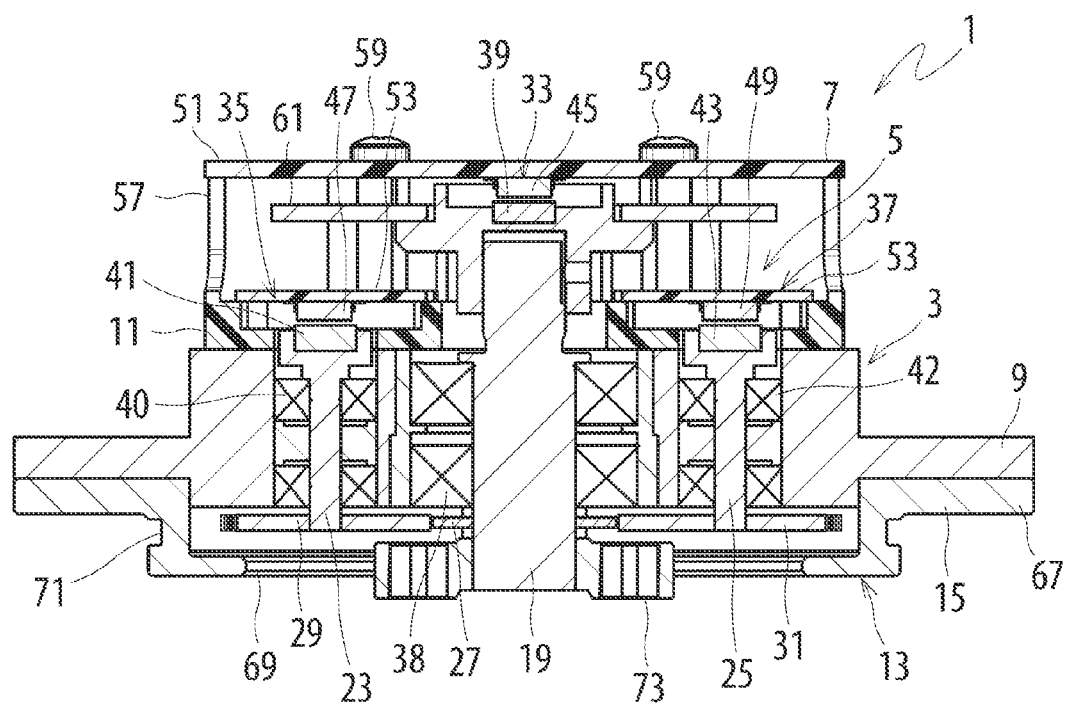
FIG. 3 is a cross-sectional view taken along line A-A of FIG. 2A.
Figure 4:
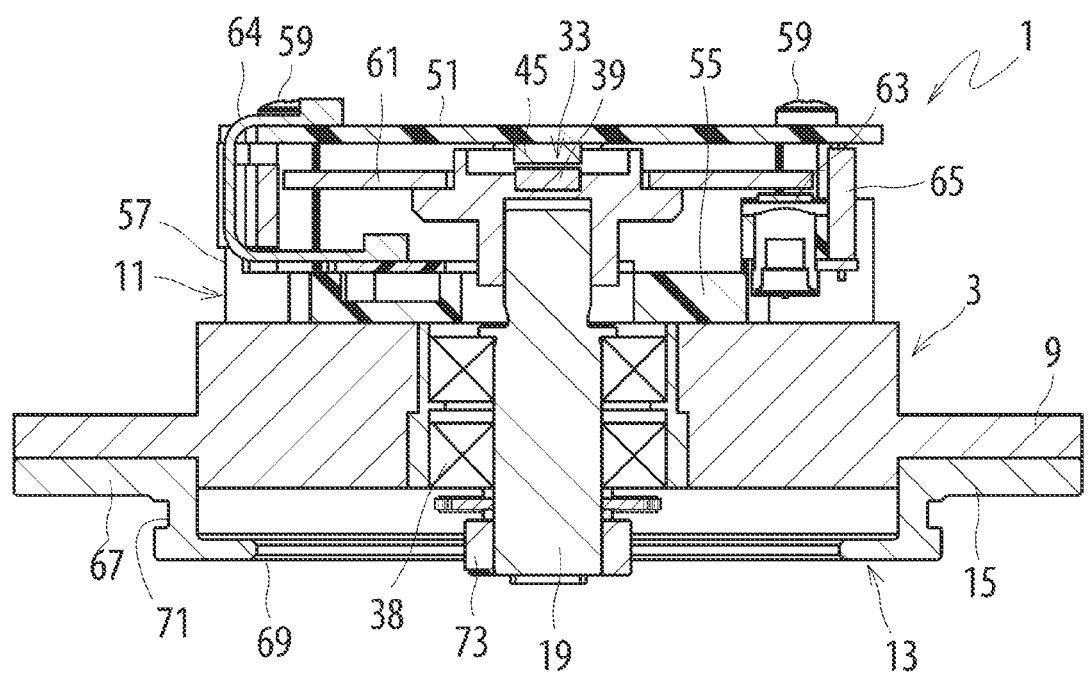
FIG. 4 is a cross-sectional view taken along line B-B of FIG. 2A.

An absolute encoder according to an embodiment of the present invention will be described in detail below with reference to the drawings. FIG. 1 is an exploded perspective view of an absolute encoder 1 according to the embodiment. In FIG. 1, only main parts are shown, and some parts are not shown. FIGS. 2A and 2B are a plan view and a bottom view, respectively, of the absolute encoder 1 according to the embodiment. FIG. 3 is a cross-sectional view taken along line A-A of FIG. 2A. FIG. 4 is a cross-sectional view taken along line B-B of FIG. 2A. The absolute encoder 1 according to the embodiment is configured such that a magnetic encoder device 5 serving as a position detecting device and an optical encoder device 7 are housed in a housing 3. The housing 3 includes a bearing holder 9 forming a partition wall portion of the housing 3, a first housing portion 11 fixed to the bearing holder 9, and a base member 15 fixed to the bearing holder 9 to form a second housing portion 13 together with the bearing holder 9. The bearing holder 9 and the base member 15 are coupled to each other by screw members 17. The first housing portion 11 is formed from a molded member integrally molded of an insulating resin, and fixed to the bearing holder 9 by screw members (not shown).

The magnetic encoder device 5 used as the position detecting device includes a main shaft 19 and two sub shafts 23 and 25 coupled to the main shaft 19 via a gear mechanism 21 to rotate in synchronization with the main shaft 19. The gear mechanism 21 includes a first gear 27 fixed to a first end of the main shaft 19, and second and third gears 29 and 31 fixed to respective first ends of the first and second sub shafts 23 and 25 to mesh with the first gear 27. The magnetic encoder device 5 includes first to third magnetic encoder portions 33, 35, and 37 operable to detect the respective angular positions of the main shaft 19 and the two sub shafts 23 and 25 by utilizing magnetism. In the embodiment, the first to third magnetic encoder portions 33, 35, and 37 form the first to third position detecting sections, respectively.

The bearing holder 9 is fixedly provided with bearings 38, 40, and 42 capable of rotatably supporting the main shaft 19 and the two sub shafts 23 and 25 that rotate in synchronization with the main shaft 19, respectively. Magnetism generating elements 39, 41, and 43 are fixedly mounted at second ends of the main shaft 19 and the two sub shafts 23 and 25, respectively. The second ends project from the bearing holder 9. The housing 3 houses a first magnetism detecting element 45 operable to detect magnetism of the magnetism generating element 39 provided at the second end of the main shaft 19, and second and third magnetism detecting elements 47 and 49 operable to detect magnetism of the magnetism generating elements 41 and 43 provided at the second ends of the two sub shafts 23 and 25, respectively. The magnetism generating elements 39, 41, and 43 and the magnetism detecting elements 45, 47, and 49 form the magnetic encoder portions 33, 35, and 37, respectively. The magnetism generating elements 39, 41, and 43 each include one or more permanent magnets having one or more N poles and one or more S poles. The magnetism detecting elements 45, 47, and 49 each include a Hall element operable to detect magnetic flux emanating from the one or more permanent magnets to output a detection signal. The first magnetism detecting element 45 is fixed to a circuit substrate 51 fixed to the first housing portion 11. The second and third magnetism detecting elements 47 and 49 are fixed to a sub circuit substrate 53 disposed in the first housing portion 11. The sub circuit substrate 53 may be formed from two divided substrates.

The first housing portion 11 of the housing 3 includes a bottom wall portion 55 that contacts the bearing holder 9, and a peripheral wall portion 57 integrally provided with the bottom wall portion 55 to extend in a direction away from the bearing holder 9. In the embodiment, the circuit substrate 51 can be fixed to the peripheral wall portion 57 using screws 59. Thus, the circuit substrate 51 may be utilized as a lid member for the first housing portion 11, and may be firmly fixed to the first housing portion 11.

In order to detect the angular position of the main shaft 19 by utilizing light, the optical encoder device 7 includes a rotary disc 61 fixed to the main shaft 19, a light receiving element (not shown) fixed to the circuit substrate 51, and a light emitting element 63 fixed to the first housing portion 11. A plurality of slit arrays each including one or more slits arranged in the circumferential direction are formed in the rotary disc 61. The configuration of the optical encoder device 7 is known in the art to which the present invention pertains, and the description thereof is omitted herein. The optical encoder device 7 may be configured such that the slits of the rotary disc 61 transmit light, or the light reflected by the rotary disc 61 may be received. In the embodiment, the rotary disc 61 is disposed between the circuit substrate 51 and the sub circuit substrate 53. As shown in FIG. 4, the circuit substrate 51 and the sub circuit substrate 53 are electrically connected to each other via two electrical connection members 64 and 65. The electrical connection member 64 is formed from a metal conductor. The electrical connection member 65 is formed by insert molding using a plurality of pin terminals as inserts. The electrical connection members 64 and 65 connect circuit patterns formed on the circuit substrate 51 and the sub circuit substrate 53 to each other, thereby forming a detecting circuit.

The base member 15 forming a part of the second housing portion 13 includes an annular flange portion 67 fixed to the bearing holder 9, and a cylindrical portion 71 integrally provided with the annular flange portion 67 to surround the gear mechanism 21 and having an opening portion 69 formed in the center of the cylindrical portion 71 to expose the first end of the main shaft 19. If the second housing portion 13 is formed by the base member 15 and the bearing holder 9, the gear mechanism 21 may be assembled with the base member 15 removed, thereby facilitating the assembling of the gear mechanism 21. In the embodiment, an Oldham coupling 73 is fixed to the first end of the main shaft 19. A part of the Oldham coupling 73 is exposed from the opening portion 69. Thus, the base member 15 works as a protection member for the Oldham coupling 73.

In the embodiment, the bearing holder 9 of the housing 3 serves as the partition wall portion configured to separate the gear mechanism 21 from other constituent parts of the magnetic encoder device 5 (such as the magnetism generating elements 39, 41, and 43 and the magnetism detecting elements 45, 47, and 49), the optical encoder device 7, the circuit substrate 51, and the sub circuit substrate 53. If the gear mechanism 21 is separated from other constituent parts, abrasion powder or grease can be reliably prevented from scattering from the gear mechanism 21 to adhere to constituent parts of the optical encoder device 7. Further, in the embodiment, the magnetic encoder device 5 which calculates the multiple rotations from the positional relationship between the plurality of sub shafts 23 and 25 driven by the main shaft 19 via the gear mechanism 21 with different rotational ratios is used as means for storing data on multiple rotations. Thus, it is not necessary to utilize a battery in order to store such data. Data on the rotational angle within each rotation are detected using the optical encoder device 7, and thus detected data are combined with output of the magnetic encoder device 5 to detect an absolute position, thereby enhancing positional resolution.

In the embodiment described above, the magnetic encoder device 5 which includes two sub shafts and three magnetic encoder portions is used to acquire data on the multiple rotations. However, it is a matter of course that the number of sub shafts and the number of magnetic encoder portions may be further increased to further enhance resolution.

In the embodiment described above, the bearing holder 9 and the first housing portion 11 are formed as separate parts, and the bearing holder 9 is used as the partition wall portion. However, it is a matter of course that the bearing holder 9 and the first housing portion 11 may be integrally formed with each other.

In the embodiment described above, a magnetic encoder device is used as the position detecting device including the gear mechanism. However, it is a matter of course that a resolver or an optical encoder may be used as the position detecting device including the gear mechanism.

According to the present invention, adhesion of scattered matter to the optical encoder device can be reliably prevented, thereby eliminating erroneous detection.

While certain features of the invention have been described with reference to example embodiments, the description is not intended to be construed in a limiting sense. Various modifications of the example embodiments, as well as other embodiments of the invention, which are apparent to persons skilled in the art to which the invention pertains, are deemed to lie within the spirit and scope of the invention.

What is claimed is:

1. An encoder comprising:
   a position detecting device including a gear mechanism, a main shaft, n stub shafts coupled to the main shaft via the gear mechanism to rotate in synchronization with the main shaft wherein n is an integer of 1 or more, and (1+n) position detecting sections operable to detect the respective angular positions of the main shaft and the n sub shafts
   an optical encoder device configured to detect the angular position of the main shaft by utilizing light;
   a housing that houses the position detecting device and the optical encoder device, and,
   a circuit substrate including a detecting circuit operable to detect the absolute position of the main shaft based on a signal output from the position detecting device and a signal output from the optical encoder device, wherein:
   the optical encoder device includes a rotary disc fixed to the main shaft, and a light emitting element and a light receiving element which are fixed to the circuit substrate;
   the housing includes a partition wall portion provided with a plurality of bearings capable of rotatably supporting the main shaft and the n sub shafts, a first housing portion configured to house the (1+n) position detecting sections and the optical encoder device, and a second housing portion configured to house the gear mechanism; and
   the partition wall portion separates the gear mechanism from the (1+n) position detecting sections, the optical encoder device, and the circuit substrate.

2. The encoder according to claim 1, wherein:
   (1+n) gears forming the gear mechanism are fixedly mounted at first ends of the main shaft and the n sub shafts, respectively;
   magnetism generating elements are fixedly mounted at second ends of the main shaft and the n sub shafts, respectively, the second ends projecting from the partition wall portion;
   the housing houses a first magnetism detecting element operable to detect magnetism of the magnetism generating element provided at the second end of the main shaft, and second to n-th magnetism detecting elements operable to detect magnetism of the magnetism generating elements provided at the second ends of the n sub shafts, respectively; and
   the magnetism generating element provided at the second end of the main shaft and the first magnetism detecting element form one of the position detecting sections, and the magnetism generating elements provided at the second ends of the n sub shafts and the second to n-th magnetism detecting elements form the remaining position detecting sections.

3. The encoder according to claim 2, wherein:
   the first housing portion of the housing includes a bottom wall portion that contacts the partition wall portion, and a peripheral wall portion integrally provided with the bottom wall portion to extend in a direction away from the partition wall portion;
   a sub circuit substrate is provided in the first housing portion of the housing;
   the circuit substrate is fixed to the peripheral wall portion;
   the first magnetism detecting element is fixed to the circuit substrate; and
   the second to n-th magnetism detecting elements are fixed to the sub circuit substrate.

4. The encoder according to claim 3, wherein:
   the rotary disc is disposed between the circuit substrate and the sub circuit substrate; and
   one of the light emitting element and the light receiving element is fixed to the circuit substrate, and the other is fixed in the first housing portion.

5. The encoder according to claim 3, wherein
the circuit substrate and the sub circuit substrate are electrically connected to each other via an electrical connection member.
6. The encoder according to claim 1, wherein
the second housing portion comprises a base member and the partition wall portion, the base member including an annular flange portion fixed to the partition wall portion, and a cylindrical portion integrally provided with the annular flange portion to surround the gear mechanism and having an opening portion formed in the center of the cylindrical portion to expose the first end of the main shaft.
7. The encoder according to claim 6, wherein
a coupling is fixed to the first end of the main shaft, the coupling being partly exposed from the opening portion.

* * * * *